United States Patent
Prasad et al.

(10) Patent No.: US 6,552,498 B1
(45) Date of Patent: Apr. 22, 2003

(54) METHOD AND CIRCUIT FOR CONTROLLING CURRENT IN A HIGH PRESSURE DISCHARGE LAMP

(75) Inventors: Himamshu V. Prasad, Rolling Meadows, IL (US); Young G. Kang, Vernon Hills, IL (US); John G. Konopka, Deer Park, IL (US); Warren Moscowitz, Ipswich, MA (US)

(73) Assignee: Osram Sylvania Inc., Danvers, MA (US)

(*) Notice: Subject to any disclaimer, the term of this patent is extended or adjusted under 35 U.S.C. 154(b) by 61 days.

(21) Appl. No.: 09/967,191

(22) Filed: Sep. 28, 2001

(51) Int. Cl.[7] .............................................. H05B 37/02
(52) U.S. Cl. ........................ 315/244; 315/224; 315/307
(58) Field of Search ................................. 315/307, 224, 315/219, 302, 244

(56) References Cited

U.S. PATENT DOCUMENTS 5,144,204 A * 9/1992 Nerone et al. .......... 315/209 R

* cited by examiner

Primary Examiner—David Vu
(74) Attorney, Agent, or Firm—Kenneth D. Labudda

(57) ABSTRACT

A circuit for controlling current during run-up of a high pressure discharge lamp (140) comprises a buck converter (120) for generating a buck current to drive the high pressure discharge lamp and a control circuit (202) coupled to the buck converter (120) for varying the duty cycle of the buck current during run-up is disclosed. A method for controlling current in an electronic ballast during run-up of a high pressure discharge lamp comprises steps of detecting (501) lamp ignition, providing (502) a buck current to drive the lamp, and varying (504) the duty cycle of the buck current during run-up to control (506) the current in the lamp is also disclosed.

28 Claims, 4 Drawing Sheets

(Run Up Mode)

(Steady State)

METHOD AND CIRCUIT FOR CONTROLLING CURRENT IN A HIGH PRESSURE DISCHARGE LAMP

FIELD OF THE INVENTION

The present invention generally relates to electronic ballasts, and more particularly to a method and circuit for controlling the current in a high pressure discharge lamp.

BACKGROUND OF THE INVENTION

In starting a high intensity discharge (HID) lamp, the lamp experiences three phases before achieving steady-state operation. These phases include breakdown, glow discharge, and thermionic emission. Breakdown requires a high voltage to be applied to the lamp. Following breakdown, the voltage must be high enough to sustain a glow discharge and heat the electrode to thermionic emission. Once thermionic emission commences, current must be maintained, in the run-up phase, until the electrode reaches its steady-state temperature. Upon completion of the run-up phase, the lamp can be operated with a lower level of current in the steady-state operating mode.

Lamp manufacturers generally specify that, during the run-up phase, the lamp current needs to be limited to less than 2X, where X is the steady-state rated lamp current. If the current is not so limited during run-up, the electrodes of the lamp may be damaged and/or the useful life of the lamp may be reduced. Moreover, it is desirable that the current during run-up be selectively controlled so as to achieve steady-state operation efficiently and promptly. Accordingly, it is desirable to provide an electronic ballast which selectively controls the current during run-up.

One known type of low frequency ballast employs a buck converter and a full-bridge inverter. The buck converter functions as a current source and provides a magnitude limited current to the lamp. The full-bridge inverter ensures that the current through the lamp is reversed in a periodic manner.

A conventional buck converter does not allow for selective control of the lamp current during the run-up phase. One known prior art solution is to modify the buck converter so that it operates at a variable frequency during the run-up phase (as compared with a fixed frequency during steady-state operation). Another solution, currently unknown in the prior art, is to operate the buck converter at a variable duty cycle during the run-up phase.

Accordingly, it is desirable to provide a control circuit that operates a buck converter at a variable duty cycle during the run-up phase so as to preserve the useful life of the lamp and promptly achieve steady-state operation.

DETAILED DESCRIPTION OF THE PREFERRED EMBODIMENTS

Figure 1:
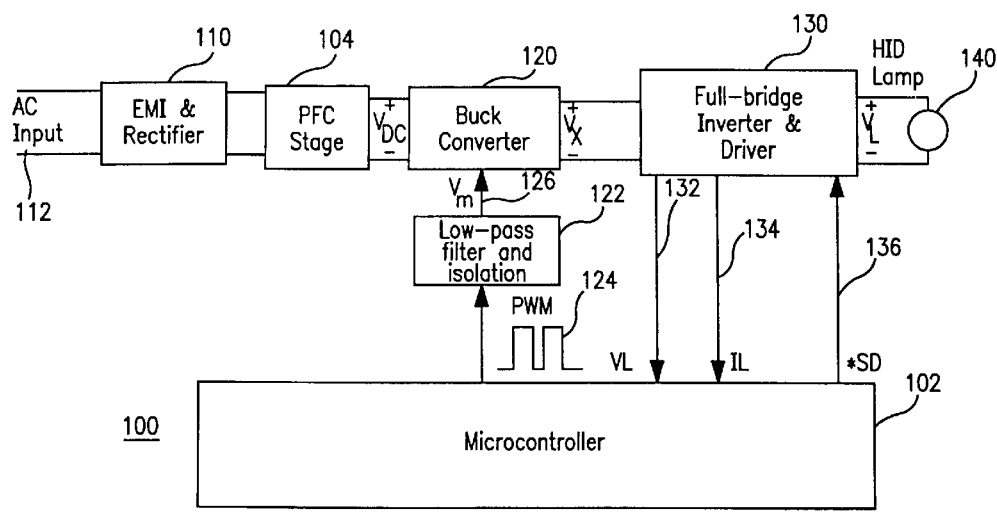
FIG. 1 is a block diagram of a circuit for controlling current in a high pressure discharge lamp, in accordance with the present invention.

Referring to FIG. 1, a ballast 100 for controlling the operation of a high pressure discharge lamp 140 includes a buck converter 120, a full-bridge inverter & driver 130, a microcontroller 102, and a low-pass filter & isolation circuit 122. As is well known in the art, ballast 100 further includes an EMI & rectifier stage 110 and a power factor correction (PFC) stage 104. EMI & rectifier stage 110 receives an AC input 112 and provides a rectified AC signal to PFC stage 104. PFC stage provides a substantially direct current (DC) voltage, $V_{DC}$, to buck converter 120.

Buck converter 120 generally controls the current provided to lamp 140 and generates an output voltage, Vx, provided to full-bridge inverter & driver 130. Low-pass filter & isolation circuit 122 receives a pulse width modulated (PWM) signal 124 from microcontroller 102, and provides a control signal 126, $V_m$, to buck converter 120. As will be described in greater detail below, $V_m$ introduces a DC offset to a current-sense signal generated within buck converter 120. The microcontroller 102 is also coupled to the full-bridge inverter 130 to detect a voltage signal ($V_L$) 132 and a current signal ($I_L$) 134 associated with inverter 130 and/or lamp 140; alternatively, $I_L$ can be sensed indirectly by monitoring a buck current generated by buck converter 120. The microcontroller 102 also provides a SD signal 136 to inverter 130 to shut down inverter 130 if necessary.

Figure 2:
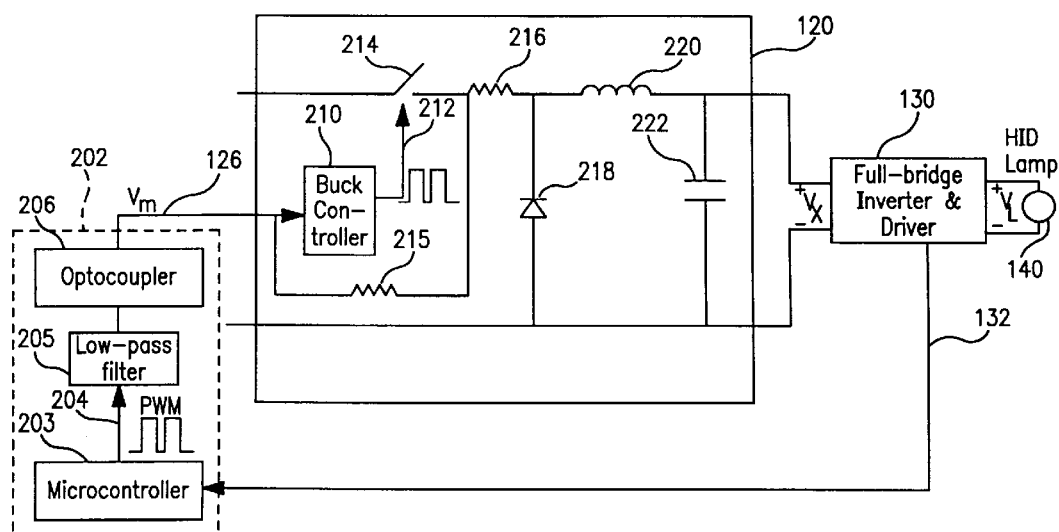
FIG. 2 is a schematic diagram of a control circuit for controlling current in a high pressure discharge lamp, in accordance with the present invention.

A detailed diagram of buck converter 120 and a preferred control circuit 202 is provided in FIG. 2. Buck converter 120 includes a buck controller 210, a buck switch 214, a coupling resistor 215, a current-sense resistor 216, a buck rectifier 218, an inductor 220, and a capacitor 222. Buck controller 120 is coupled to control circuit 202 and buck switch 214. During operation, buck controller 120 provides a pulse-width modulated output signal 212 for turning buck switch 214 on and off. Pulse-width modulated output signal 212 has a duty cycle that is a function of control signal $V_m$ and the voltage across current-sense resistor 216. Buck controller may be implemented using a standard current-mode controller integrated circuit (I.C.), such as the UC2845 I.C. manufactured by Unitrode, Inc. Buck switch 214, which may be implemented as a field effect transistor (FET), is coupled to coupling resistor 215 and current sense resistor 216. Coupling resistor 215 is coupled to control circuit 202 and buck controller 210. Current-sense resistor 216 is coupled to buck rectifier 218 and inductor 220. Inductor 220 is coupled to capacitor 222 and full-bridge inverter 130.

Control circuit 202 includes a microcontroller 203, a low-pass filter 205, and an optocoupler 206. Microcontroller 203 is coupled between full-bridge inverter 130 and low-pass filter 205. During operation, microcontroller 203 monitors one or more signals 132 from inverter 130 and provides an output signal 204 having a duty cycle in dependence thereon, in accordance with its own internal algorithms. A preferred internal algorithm for microcontroller 203 is described in further detail below with reference to FIG. 8. Low-pass filter 205 is coupled between microcontroller 203 and optocoupler 206. During operation, low-pass filter 205 receives the pulse-width modulated output signal 204 from microcontroller 203 and provides a substantially direct current (DC) voltage to the input of optocoupler 206. Optocoupler 206 is coupled between low-pass filter 205 and buck controller 210. Optocoupler 206 provides electrical isolation that is required because of the fact that the voltage across current-sense resistor 216 is ground referenced to the cathode of buck rectifier 218, while the signal(s) 132 from inverter 130 are ground referenced to some other point (such as the anode of buck rectifier 218). During operation, optocoupler 206 receives the output voltage from low-pass filter 205 and provides a corresponding voltage $V_m$ that is ground referenced in the same way as the voltage across current-sense resistor 216. This is important because $V_m$ is combined with the voltage across current-sense resistor 216 (via coupling resistor 215) in order to dictate the resulting duty cycle of the PWM signal 212 at the output of buck controller 210. As an alternative to optocoupler 206, one can use a pulse transformer interposed between the output 204 of microcontroller 203 and low-pass filter 205.

Figure 3:
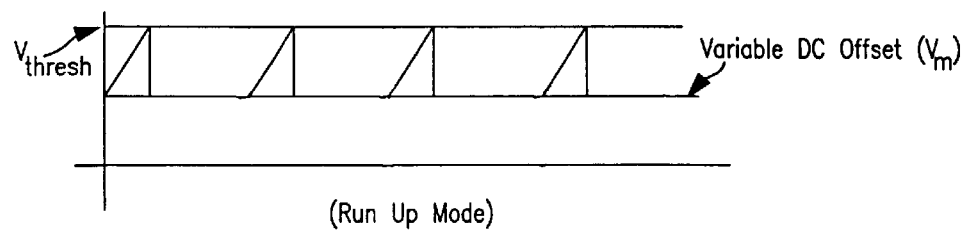
FIG. 3 is a voltage diagram showing the modified current-sense signal applied to the buck controller during run-up, in accordance with the present invention.
Figure 4:
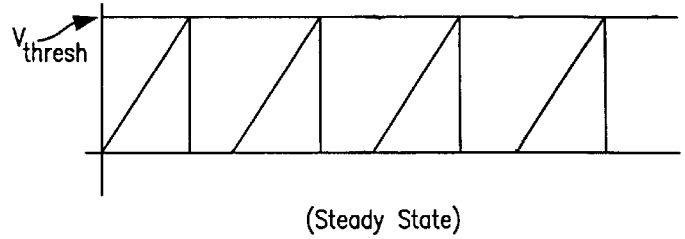
FIG. 4 is a voltage diagram showing the modified current-sense signal applied to the buck controller during steady-state, in accordance with the present invention.

Once the lamp 140 ignites, the buck duty cycle is reduced to a value such that the lamp run-up current is limited to within 2X, where X is the steady-state rated lamp current. It should be appreciated that, immediately following lamp ignition, the voltage across the lamp will be quite low (e.g., 25 volts) in comparison with its steady-state value. Consequently, and absent a substantial reduction in the buck duty cycle, the buck converter will attempt to supply a lamp current that easily exceeds 2X. Thus, it is necessary that the buck duty cycle be properly reduced when the lamp ignites; as the lamp warms up, the voltage across the lamp will increase and thus allow the buck converter to be operated at a higher duty cycle without having the lamp current exceed 2X. The duty cycle is preferably reduced by injecting a variable DC offset, $V_m$. The higher the value of $V_m$, the lower the duty cycle of the pulse-width modulated output signal 212 that is generated by buck controller 212 for driving buck switch 214, as shown for example in FIG. 3. Lowering the duty cycle at which buck switch 214 is operated lowers the current that flows through lamp 140. The value of the DC signal $V_m$ can be varied during run-up to vary the duty cycle of the buck current, as will be described in more detail with reference to the remaining figures. Once the lamp run-up is complete, the DC offset $V_m$ is substantially eliminated (though not necessarily set to zero), as shown in FIG. 4, allowing the buck current sense resistor 216 alone to determine the duty cycle of output signal 212 provided by buck controller 210. This type of current control will ensure a smooth run-up period for the lamp and a soft transition for the lamp current and, consequently, for the lamp electrode temperature.

Figure 5:
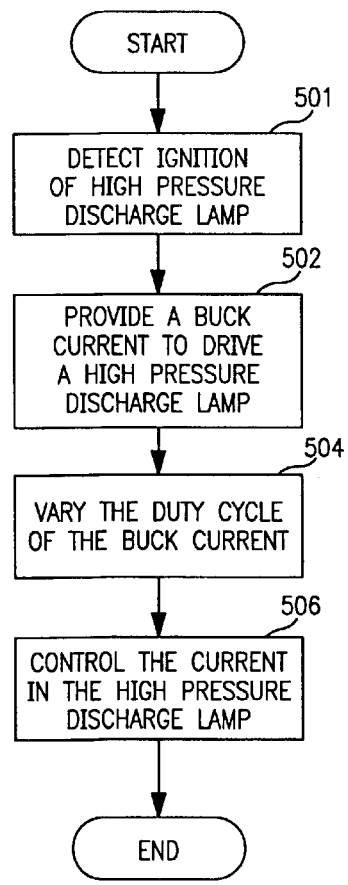
FIG. 5 is a flow chart showing a method of controlling current in a high pressure discharge lamp during run-up, in accordance with a first preferred embodiment of the present invention.

Turning now to FIG. 5, a flow chart shows a method for controlling current during run-up according to a first preferred embodiment of the present invention. After ignition of the lamp is detected at step 501, an electronic control circuit, such as the control circuit of FIG. 2, provides a buck current to drive a high pressure discharge lamp at a step 502. The control circuit varies the duty cycle of the buck current at a step 504. Finally, the control circuit controls the current in the high pressure discharge lamp at a step 506.

Figure 6:
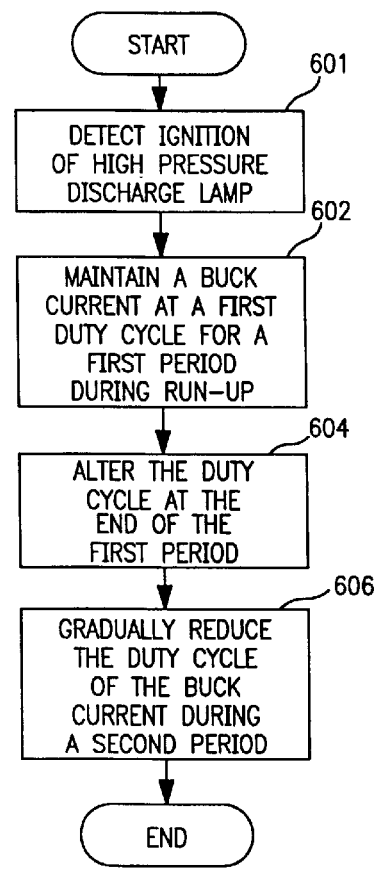
FIG. 6 is a flow chart showing a method of controlling current in a high pressure discharge lamp during run-up, in accordance with a second preferred embodiment of the present invention.

Turning now to FIG. 6, a flow chart shows a method for controlling the current in a high pressure discharge lamp during run-up according to a second preferred embodiment of the present invention. After ignition of the lamp is detected at step 601, an electronic control circuit maintains the buck current at a first duty cycle for a first period of time during run-up at a step 602. The electronic control circuit alters the duty cycle at the end of the first period at a step 604. The end of the first period of time could be, for example, after 6 cycles in a 75 cycle run-up stage. If the total run-up time is approximately one minute, the first period could be approximately 5 seconds. The electronic control circuit then gradually increases the duty cycle of the buck current during a second period at a step 606. The increase in the duty cycle of the buck current could be linear or at some other variable rate which maintains the current in the lamp below a predetermined level while completing run-up of the lamp in a reasonably fast manner. The preferred rate of reduction depends upon a number of factors, including the design of the ballast, the type of lamp, the wattage of the lamp, etc.

Figure 7:
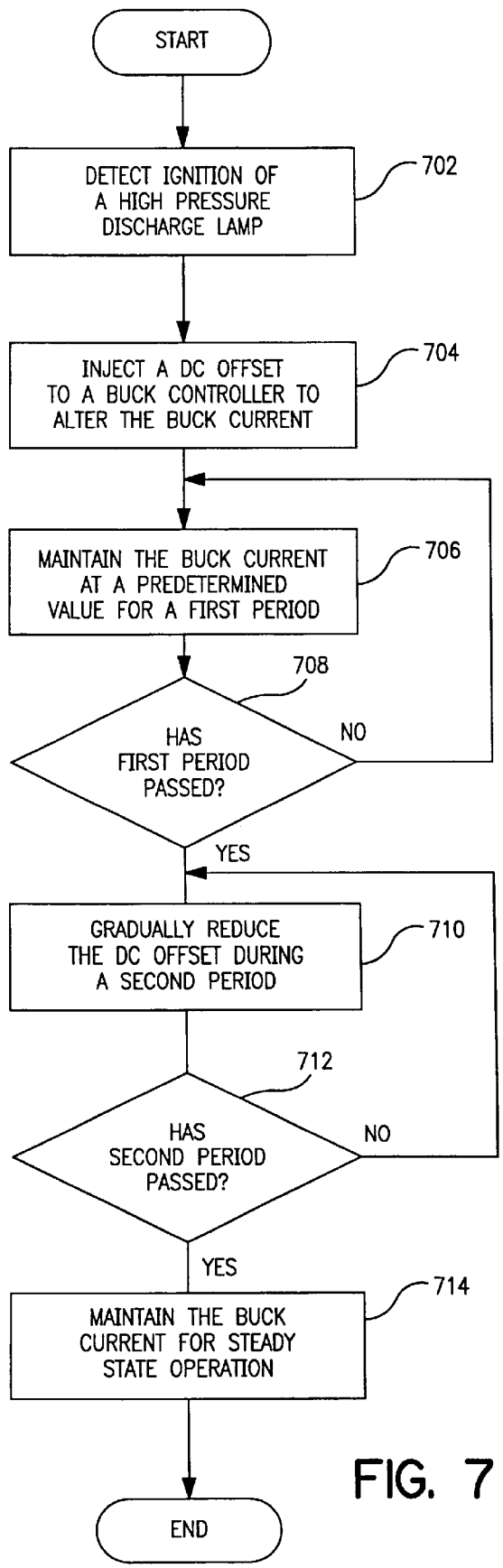
FIG. 7 is a flow chart showing a method of controlling current in a high pressure discharge lamp during run-up, in accordance with a third preferred embodiment of the present invention.

Turning now to FIG. 7, a flow chart shows a method for controlling the current in a high pressure discharge lamp during run-up according to a third preferred embodiment of the present invention. A control circuit detects the ignition of a high pressure discharge lamp at a step 702. A DC offset is then injected to a buck controller to alter the duty cycle of the buck current (and, hence, the magnitude of the buck current itself) at a step 704. The control circuit maintains the buck current at a predetermined value for a first predetermined period of time at a step 706. After the first predetermined period of time has passed at a step 708, the control circuit gradually reduces the DC offset during a second period at a step 710. After the second period has passed and run-up is complete at a step 712, the control circuit maintains the buck current for steady operation at a step 714. Although two periods are shown, the current could be varied through any number of periods (i.e., more than two periods) and varied at different rates during the periods.

Figure 8:
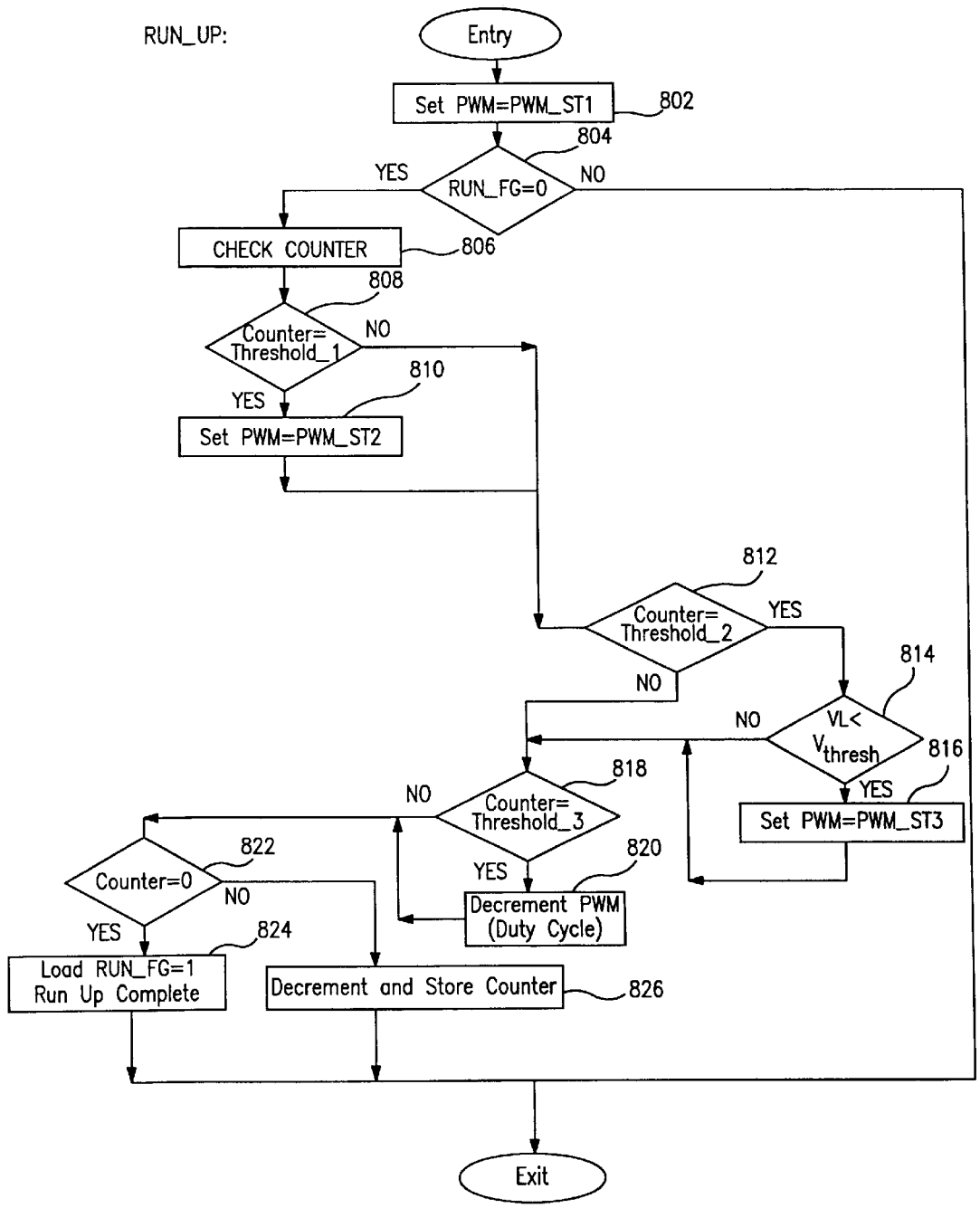
FIG. 8 is a flow chart showing a method of controlling current in a high pressure discharge lamp during run-up, in accordance with a fourth preferred embodiment of the present invention.

Turning now to FIG. 8, a flow chart shows a detailed operation of a method for controlling current in a high pressure discharge lamp according to a fourth preferred embodiment of the present invention. It is considered highly desirable to bring the lamp to full light output as soon as possible, but without damaging the lamp; allowing the lamp to reach full light output too quickly could lead to lamp blackening. According to the flow chart of FIG. 8, the duty cycle of the output signal from the microcontroller is set at a first predetermined value at a step 802; as described with reference to the circuit of FIG. 2, for example, a first DC offset value is preferably provided to buck controller 210.

Microcontroller 203 then determines whether a RUN_FG signal is equal to zero at a step 804. If the RUN_FG signal is equal to zero indicating the start of the run-up stage, microcontroller then checks an internal counter at a step 806, and determines whether the counter equals a first threshold at a step 808. Until the counter reaches the first threshold, the microcontroller maintains the duty cycle of its output signal ("PWM"), and therefore the value of $V_m$, at a fixed value.

If the counter equals the threshold, the microcontroller sets the duty cycle of its output signal to a second predetermined value at a step 810. The first threshold could be at a count of 69 in a 75 cycle run-up stage (i.e., counting down from 75), for example. The microcontroller then determines whether the counter reaches a second predetermined threshold at a step 812. The second predetermined threshold could be at a count of 38 of a 75 count cycle, for example.

If the second threshold is reached, the microcontroller determines whether a lamp voltage (VL) is less than a threshold voltage (Vthresh) at a step 814. If the lamp voltage is less than the threshold voltage, the microcontroller sets the duty cycle of its output signal to a third predetermined value at a step 816. That is, if the lamp voltage is less than a predetermined threshold voltage, the microcontroller allows more current to the lamp to enable the lamp to get to a full output more quickly. If the lamp voltage is not less than the threshold voltage, the microcontroller determines whether a counter equals a third threshold at a step 818.

If the counter equals the third threshold, the microcontroller decrements the duty cycle of its output signal at a step 820. The third threshold could be at a count of 35 in a 75 count cycle. If the counter does not equal the third threshold, the microcontroller determines whether the counter equals 0 at a step 822. If the counter equals 0, the run-up is complete and RUN_FG is set equal to one at a step 824. If the counter does not equal 0 at a step 822, the microcontroller decrements the counter at a step 826.

Although the invention has been described with reference to a specific preferred embodiments, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

We claim:

1. A method for controlling current during run-up of a high pressure discharge lamp, the method comprising the steps of:

providing a buck current to drive the high pressure discharge lamp;

varying the duty cycle of the buck current during run-up to limit the current in the lamp to within a specified maximum value.

2. The method of claim 1, wherein the step of varying the duty cycle of the buck current comprises:

initially setting the duty cycle of the buck current to a value that limits the current in the lamp to within the specified maximum value; and increasing the duty cycle of the buck current so as to complete run-up without the current in the lamp exceeding the specified maximum value.

3. The method of claim 1 wherein the step of varying the duty cycle of the buck current comprises altering a DC offset signal controlling said buck current.

4. The method of claim 1, wherein the step of varying the duty cycle of the buck current comprises:

operating a buck converter at a first duty cycle during a first period of time; and operating the buck converter at a second duty cycle during a second period of time, wherein the second duty cycle is different than the first duty cycle.

5. The method of claim 4, wherein the step of operating a buck converter at a first duty cycle comprises introducing a DC offset signal at a first level to set the buck current at the first duty cycle.

6. The method of claim 4, wherein the step of operating the buck converter at a second duty cycle comprises introducing a DC offset signal at a second level to set the buck current at the second duty cycle.

7. The method of claim 1, wherein the step of varying the duty cycle of the buck current comprises:

operating a buck converter at a first duty cycle during a first period of time; and varying the duty cycle of the buck current during a second period of time, wherein the second duty cycle is different than the first duty cycle.

8. The method of claim 7, wherein the step of varying the duty cycle of the buck current during the second period of time comprises increasing the duty cycle of the buck current at a variable rate until run-up is completed.

9. The method of claim 8, wherein the step of varying the duty cycle of the buck current during the second period of time comprises increasing the duty cycle of the buck current at a rate to reduce the current in the lamp at a substantially linear rate until run-up is completed.

10. The method of claim 1, wherein the step of varying the duty cycle of the buck current comprises altering the duty cycle of the buck current at a predetermined time during run-up.

11. The method of claim 4, further comprising the steps of:

monitoring a signal associated with a voltage across the lamp;

determining if the signal is less than a predetermined threshold value; and operating the buck converter at a third duty cycle for at least a limited period of time if the signal is less than the predetermined threshold value.

12. A method for controlling current during run-up of a high pressure discharge lamp, the method comprising the steps of:

operating a buck converter at a first duty cycle during a first period of time;

altering the duty cycle of the buck converter at a first predetermined time; and operating the buck converter at a second duty cycle after the first predetermined period of time, wherein the second duty cycle is different than the first duty cycle.

13. The method of claim 12, wherein the step of operating a buck converter at a first duty cycle comprises introducing a DC offset signal at a first level to set the duty cycle of the buck converter to the first duty cycle.

14. The method of claim 12, wherein the step of altering the duty cycle of the buck converter comprises varying the duty cycle of the buck converter during a second period of time.

15. The method of claim 12, wherein the step of operating the buck converter at a second duty cycle comprises operating the buck converter at a second duty cycle for a second period of time.

16. The method of claim 15, further comprising a step of varying the duty cycle of the buck converter after the second period of time until steady state operation.

17. The method of claim 15, further comprising the steps of:

monitoring a signal associated with a voltage across the lamp;

determining if the signal is less than a predetermined threshold value; and operating the buck converter at a third duty cycle for at least a limited period of time if the signal is less than the predetermined threshold value.

18. A method for controlling lamp current during run-up of a high pressure discharge lamp, the method comprising the steps of:

detecting ignition of the high pressure discharge lamp;

operating a buck converter at a first duty cycle for a first period of time during run-up to maintain the current in the lamp below a specified maximum value;

operating the buck converter at a second duty cycle for a second period of time after the first period, wherein the second duty cycle is greater than the first duty cycle; and altering the duty cycle of the buck converter during a third period of time to reduce the lamp current before steady state operation is reached.

19. The method of claim 18, further comprising the steps of:

monitoring a signal associated with a voltage across the lamp;

determining if the signal is less than a predetermined threshold value; and operating the buck converter at a third duty cycle for at least a limited period of time if the signal is less than the predetermined threshold value.

20. The method of claim 19, wherein the steps of monitoring, determining, and increasing are performed following completion of the second period of time.

21. A circuit for controlling current during run-up of a high pressure discharge lamp, the circuit comprising:

a buck converter for generating a buck current to drive said high pressure discharge lamp, the buck converter operating at a duty cycle; and a control circuit coupled to the buck converter for varying the duty cycle of the buck converter during run-up.

22. The circuit of claim 21, wherein:

the buck converter includes a buck controller having an input for receiving a current-sense signal; and the control circuit is coupled to the input of the buck controller, and operable to provide a variable DC offset signal at the input of the buck controller during run-up of the high pressure discharge lamp.

23. The circuit of claim 22, wherein the DC offset signal is set at a first level for a first predetermined period of time, a second level for a second predetermined period of time, and a variable level for a third predetermined period of time.

24. The circuit of claim 21, wherein the control circuit comprises:

a microcontroller operably coupled to the lamp, and operable to provide a pulse-width modulated output signal having a duty cycle dependent on time and at least one signal associated with the lamp;

a low-pass filter coupled to the microcontroller, wherein the low-pass filter is operable to receive the pulse-width modulated output signal provided by the microcontroller and to provide a substantially direct current (DC) output signal; and an optocoupler coupled between the low-pass filter and the buck converter, wherein the optocoupler is operable to receive the substantially DC output signal provided by the low-pass filter and to provide a DC offset to the buck converter so as to control the duty cycle of the buck converter.

25. The circuit of claim 24, wherein the pulse-width modulated signal provided by the microcontroller is set at:

a first duty cycle during a first period of time during run-up of the lamp; and a second duty cycle during a second period of time during run-up of the lamp, wherein the second duty cycle is different than the first duty cycle.

26. The circuit of claim 25, wherein the second duty cycle is varied during the second period of time until steady-state operation of the lamp is reached.

27. The circuit of claim 24, wherein the pulse-width modulated signal provided by the microcontroller is set at:

a first duty cycle during a first period of time during run-up of the lamp;

a second duty cycle during a second period of time during run-up of the lamp, wherein the second duty cycle is different than the first duty cycle; and a variable duty cycle during a third period of time during run-up of the lamp until steady-state operation of the lamp is reached.

28. The circuit of claim 23, wherein the control circuit is further operable:

to monitor a signal indicative of a voltage across the lamp; and in response to the signal being less than a predetermined threshold value following completion of the second predetermined period of time, to set the DC offset signal to a third level during at least a portion of the third predetermined period of time.

* * * * *